United States Patent

Harding et al.

Patent Number: 5,454,896
Date of Patent: Oct. 3, 1995

[54] METHOD FOR ATTACHING A FLEXIBLE INNER BAG TO THE INSIDE OF A SQUEEZEBOTTLE

[75] Inventors: Stephen W. Harding, Hamilton; Charles G. Yeazell, Cincinnati; Ronald W. Kock, Wyoming, all of Ohio

[73] Assignee: The Procter & Gamble Company, Cincinnati, Ohio

[21] Appl. No.: 271,615

[22] Filed: Jul. 7, 1994

[51] Int. Cl.[6] .......................... B65D 27/18; B65D 30/00
[52] U.S. Cl. ................ 156/156; 156/272.4; 156/291; 156/287; 156/293; 53/449; 222/107
[58] Field of Search ................ 156/156, 272.4, 156/291, 287, 303.1, 293, 379.7, 379.8; 264/516, 515; 222/107, 215; 53/175, 449; 206/277

[56] References Cited

U.S. PATENT DOCUMENTS

| | | | |
|---|---|---|---|
| 2,711,985 | 6/1955 | Olson | 156/287 |
| 2,743,038 | 4/1956 | Ferries | 222/95 |
| 3,315,348 | 1/1964 | Donovan et al. | 156/294 |
| 3,461,014 | 8/1969 | James | 156/272 |
| 3,738,892 | 6/1973 | Curcio | 156/380 |
| 3,808,074 | 4/1974 | Smith et al. | 156/69 |
| 3,945,539 | 3/1976 | Sossong | 222/386.5 |
| 3,981,418 | 9/1976 | Williamson et al. | 222/386.5 |
| 3,988,185 | 10/1976 | Johnson et al. | 156/69 |
| 4,109,815 | 8/1978 | Collins, III | 215/232 |
| 4,154,366 | 5/1979 | Acres | 222/95 |
| 4,169,004 | 9/1979 | Kock et al. | 156/227 |
| 4,180,961 | 1/1980 | Collins, III | 53/421 |
| 4,658,989 | 4/1987 | Bonerb | 222/105 |
| 4,704,509 | 11/1987 | Hilmersson et al. | 219/10.53 |
| 4,754,113 | 6/1988 | Mohr et al. | 219/10.79 |
| 4,842,165 | 6/1989 | Van Coney | 222/95 |
| 4,865,224 | 9/1989 | Streck | 222/95 |
| 4,892,230 | 1/1990 | Lynn, Jr. | 222/105 |
| 4,994,637 | 2/1991 | Fang et al. | 219/10.53 |
| 5,145,083 | 9/1992 | Takahashi | 220/206 |
| 5,158,370 | 10/1992 | Jacobi | 383/48 |
| 5,191,181 | 3/1993 | Regenscheid | 219/10.41 |
| 5,198,053 | 3/1993 | Duncan | 156/64 |
| 5,200,587 | 4/1993 | Fang | 219/10.53 |
| 5,277,015 | 1/1994 | Brown et al. | 53/449 |

Primary Examiner—Michael W. Ball
Assistant Examiner—Sam Chuan Yao
Attorney, Agent, or Firm—Ronald W. Kock; Michael E. Hilton

[57] ABSTRACT

A method for scaling a flexible inner bag inside a squeezebottle so that the flexible inner bag will invert in order to dispense viscous fluids. The method is particularly useful in single-piece squeezebottles which have a small ratio of discharge opening cross-section to body cross-section. In practicing the present invention, a flexible inner bag has heat-activated adhesive stripes applied to the upper half of its exterior. The flexible inner bag is inserted into a squeezebottle through the discharge opening and then expanded inside the squeezebottle by compressed air. After the flexible inner bag is fully expanded, and with pressure applied to the inside of the flexible inner bag, heat is applied either to the inside of the bag or to the outside of the squeezebottle by hot air, steam, radiation, or induction heating of metal particles in the adhesive. The adhesive is heat-activated and the upper half of the flexible inner bag is thereby attached to the inner side wall of the squeezebottle.

8 Claims, 2 Drawing Sheets

1

METHOD FOR ATTACHING A FLEXIBLE INNER BAG TO THE INSIDE OF A SQUEEZEBOTTLE

FIELD OF THE INVENTION

The present invention relates to processes for attaching a flexible inner bag to the inside of a squeezebottle dispenser, and more particularly to processes for inserting and attaching a flexible inner bag through a discharge opening of a single-piece outer container wherein the discharge opening is smaller in dimension than the cross-section of the container body.

BACKGROUND OF THE INVENTION

Squeezebottle dispensers having fluid-containing, flexible inner bags within them are common in the art. When a squeezebottle dispenser is squeezed, fluid is forced from the flexible inner bag through a discharge opening at the top of the dispenser. Valving in the dispenser enables air to be compressed within the squeezebottle during squeezing, but valving then allows air to vent into the bottle to replace the dispensed fluid after the squeezebottle is released. Repeated squeezing cycles cause the flexible inner bag to collapse around the fluid within the squeezebottle as the flexible inner bag empties.

A problem with such dispensers is that a flexible inner bag tends to collapse most quickly near its discharge opening. This is believed to be due to higher velocity fluid flow near the discharge opening causing lower static pressure there. Fluid flow may be choked off from the rest of the flexible inner bag if the flexible inner bag collapses prematurely near the discharge opening. To correct this problem, the manner in which the flexible inner bag can collapse is generally controlled. For example, a flexible inner bag may be designed to collapse radially about a perforated diptube connected to the discharge opening of the squeezebottle. In some circumstances, for example, when the fluid is highly viscous like toothpaste, diptubes generally provide too much resistance to fluid flow through them. For such fluids, which have viscosities great enough that they cannot flow under gravity, another collapse control approach is often used. That is, a flexible inner bag is affixed to the upper half of the inside of a squeezebottle so that the flexible inner bag can collapse by inverting axially toward the discharge opening. Flexible inner bag inversion offers minimum flow resistance.

For squeezebottle dispensers having flexible inner bags which invert toward the discharge opening, there is often a construction problem involved with inserting and affixing the flexible inner bag inside the squeezebottle. Such affixing usually involves heat sealing. The finish of the squeezebottle usually has a discharge opening smaller in circumference than the body of the squeezebottle so that the finish may later be capped with a reasonably sized closure. If the flexible inner bag is inserted into the squeezebottle from a small diameter discharge opening, it is difficult to insert a heat sealing tool into the flexible inner bag to seal the flexible inner bag to the upper half of the squeezebottle. A sealing tool would be expected to expand to press the flexible inner bag against the inner side wall of the squeezebottle. A reliable, high speed method for affixing a flexible inner bag to the inside of a squeezebottle, using an expanding tool, has been unavailable in many cases.

To avoid this problem packagers have resorted to a two-piece squeezebottle construction with an open bottom so that a flexible inner bag can be installed from a large opening in the bottom of the squeezebottle. After flexible inner bag installation, a bottom piece is sealed to the squeezebottle to close it. An example of this construction is disclosed in U.S. Pat. No. 4,842,165 to Van Coney. Van Coney's squeezebottle dispenser has a fluid-containing bag permanently sealed to the top and to the midpoint of the inside of a squeezebottle so that the fluid-containing bag inverts to dispense viscous fluid. The method securing the flexible inner bag to the squeezebottle is fusion welding, using a heated tool from inside the open bag. The bag is filled after sealing it to the container side wall. Closing the bag after filling may be another slow and difficult process.

For high speed filling and reduced part handling, it is most beneficial to have single-piece squeezebottles which can be filled from the discharge opening. Also, greater bottle shape flexibility is available with single-piece squeezebottles than with multiple piece constructions similar to Van Coney's. What is needed, however, is a bag-to-squeezebottle connection method which does not require the use of an expandable heated tool.

Others have used adhesives to affix bags inside containers. For example, U.S. Pat. No. 4,154,366 to Bonerb discloses an outer bag with an expandable liner having pressure-sensitive adhesive spots to secure the liner to the inside of the outer bag. The liner is inflated to expand it against the inside of the outer bag. The adhesive spots are on the top, sides, and bottom surfaces of the liner.

The problem with contact adhesives on a bag placed inside a squeezebottle is that they interfere with inserting and expanding the bag inside of the squeezebottle. When a flexible inner bag is inserted into the discharge opening of a single-piece squeezebottle, the bag has to be folded or partially collapsed to go through the opening. Then it has to be expanded inside the bottle before it can be bonded to the inside of the bottle.

Expansion may be hindered by contact adhesives bonding bag folds together. The expansion process also involves a certain amount of sliding between the flexible inner bag and the inner side wall of the squeezebottle, requiring a low coefficient of friction. Contact adhesives generally have a high coefficient of friction.

Induction sealing plastic parts together by heating metal embedded in one of the plastic parts, and by heating metal components which clamp the plastic parts together, are old in the art. Heat is developed by generating a high frequency oscillating magnetic field near the metal. Depending on the metal, either eddy current losses or magnetic hysteresis losses are believed responsible for heating the metal. Heat from the metal is then conducted through the plastic parts to their sealable interface. Plastic melting occurs from the conducted heat. If the plastic materials are compatible and sufficient pressure is applied, the plastic parts can be fusion welded together. The great benefit of the induction heating process is that heat can be quickly generated so that high production rates can be achieved.

Processes for sealing webs using induction sealing are old in the art. For example, U.S. Pat. No. 3,461,014 to James discloses a process in which ferrous oxide particles small enough to be mixed with conventional printing ink are printed onto a substrate. The substrate and web are combined and passed through a magnetic induction field to heat the ferrous oxide particles between the substrate and web. Then the web and substrate are passed through a pair of "squeeze rollers" to generate sufficient pressure to seal the webs together.

SUMMARY OF THE INVENTION

In practicing the present invention, the method for attaching a flexible inner bag to an inner side wall of a single-piece squeezebottle comprises the steps of constructing a flexible inner bag having an exterior surface and having adhesive stripes on the exterior surface of the flexible inner bag, inserting the flexible inner bag through a squeezebottle discharge opening and into the body of the single-piece squeezebottle, expanding the flexible inner bag inside the body of the single-piece squeezebottle, closing the single-piece squeezebottle in a substantially air-tight manner, and activating the adhesive on the exterior surface of the flexible inner bag, after the bag has been expanded, while pressurizing the flexible inner bag through the passage in the rigid fitment. By this method the exterior surface of the flexible inner bag is affixed to the inner side wall of the single-piece squeezebottle.

In one embodiment of the present invention, the adhesive activating step includes circulating a compressed, heated gas into the interior of the flexible inner bag in order to conduct heat through the flexible inner bag to activate a heat-activated adhesive, and to simultaneously apply sufficient pressure against the flexible inner bag in order to seal it to the inner side wall of the squeezebottle. The compressed, heated gas may be hot air or steam.

In another embodiment of the present invention, the adhesive activating step includes radiating heat onto the outside of a squeezebottle. The squeezebottle conducts heat to a heat-activated adhesive pressed against its inner side wall. Compressed air is introduced into the bag simultaneously to apply sufficient pressure against the flexible inner bag to seal it to the inner side wall of the squeezebottle.

In still another preferred embodiment of the present invention, the adhesive activating step includes induction heating a heat-activated adhesive from outside of the single-piece squeezebottle. The adhesive has metal particles therein for heat activation. Compressed air is introduced into the bag simultaneously to apply sufficient pressure against the flexible inner bag to seal it to the inner side wall of the squeezebottle.

In yet another preferred embodiment of the present invention, for those adhesive heat-activating sources external to the squeezebottle, the step of generating pressure inside the bag comprises the exposure of the squeezebottle with expanded bag therein to a higher than atmospheric pressure environment, followed by plugging the passage in the rigid fitment to maintain the higher than atmospheric pressure in the bag, and then removing the squeezebottle from the higher than atmospheric pressure environment before heat activating the adhesive.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
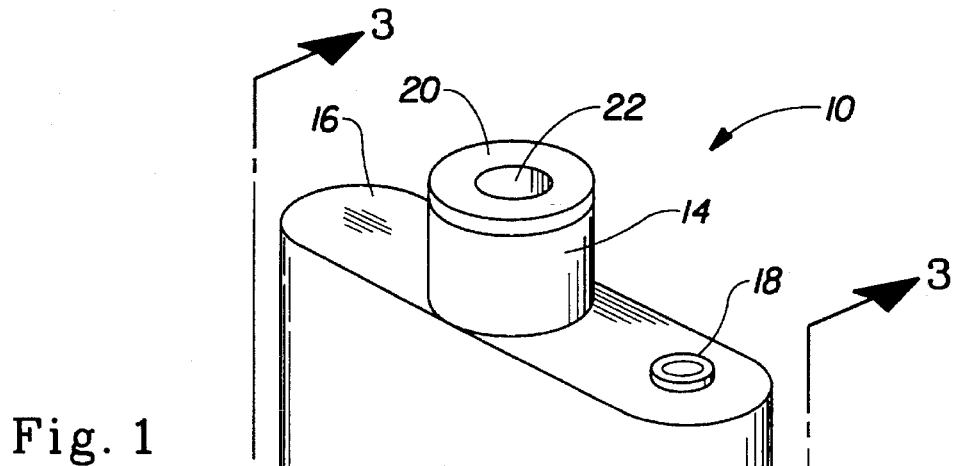
FIG. 1 is a perspective view of a preferred embodiment of a squeezebottle dispenser made by the method for attaching a flexible inner bag to the inside of a squeezebottle of the present invention.

Referring now to the drawings, and more particularly to FIG. 1, there is shown a first preferred embodiment of the present invention, which is a squeezebottle dispenser constructed by the method of attaching a flexible inner bag to the inside of a squeezebottle, and is it generally indicated as 10. Squeezebottle 10 has body 12, finish 14, and shoulder 16. Connected to shoulder 16 is vent valve 18. Vent valve 18 may be a duckbill valve, for example, which is oriented to allow air into the squeezebottle when it is released, but which prevents air escaping the squeezebottle when it is squeezed. Alternatively, vent valve 18 may be located at the bottom of squeezebottle 10. There are many alternative vent valve constructions known in the art besides duckbill valves.

Finish 14 has a discharge opening, not shown. Plugging the discharge opening in a substantially air-tight manner is a rigid bag fitment 20. Rigid bag fitment 20 has a passage 22 therethrough which is in fluid communication with the interior of a fluid-containing, flexible inner bag, not shown in FIG. 1.

Figure 2:
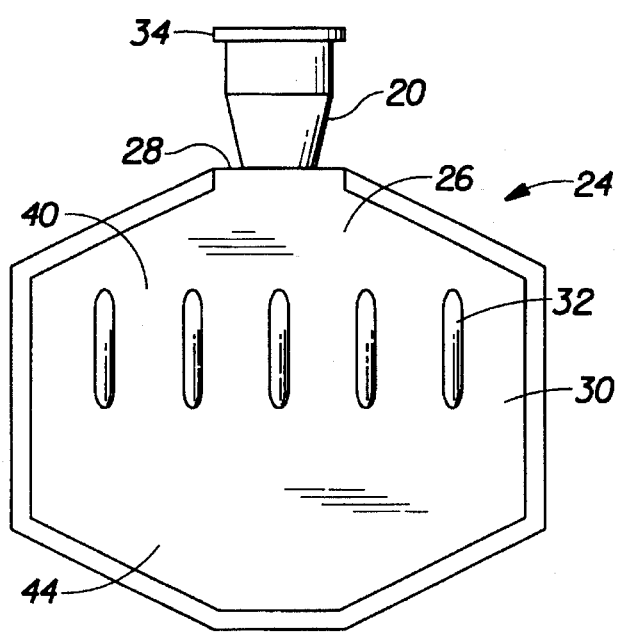
FIG. 2 is a front elevation view of a flat flexible inner bag and rigid fitment connected to the flexible inner bag, disclosing hot melt glue stripes on the exterior of the flexible inner bag.

FIG. 2 discloses a preferred flexible inner bag construction. Connected to rigid fitment 20 is flexible inner bag 24, preferably made from transparent flat film 26. The bottom surface of rigid fitment 20 is annular where it surrounds passage 22 extending through rigid fitment 20. The bottom surface of rigid fitment 20 is preferably heat sealed to film 26. Ultrasonic sealing and hot die sealing have both been used successfully for such heat sealing when both are made of compatible materials. Alternatively, film 26 could be adhesively sealed to rigid fitment 26. A continuous annular seal is required.

A hole, not shown, FIG. 2 is preferably cut into film 26 within the annular heat seal so that rigid fitment 20 will have fluid communication with the interior of the flexible bag to be formed from film 26. The hole is preferably a cross-shaped slit punched from the film side into passage 22 of rigid fitment 20. The slit results in no scrap pieces to be accumulated during the process, yet provides a hole when the slit flaps bend.

Film 26 is then folded downward where it connects to rigid fitment 20. The width of the fitment connection generates a top end 28 of the flexible bag yet to be formed. Once flat film 26 is folded, edges 30 of flat film 26 are fin-sealed together, preferably by heated dies, to form the closed flexible inner bag 24. Fin-sealed edges 30 are angled at their corners, preferably at 30° to 45° to the vertical axis of the bag, depending on the shape of squeezebottle body 12. The angled corners are beneficial to the steps of inserting and expanding flexible inner bag 24 as it is installed in squeezebottle 10. Some bag volume is lost; however, the reliability of bag expansion is greatly improved by having angled corners.

Either before or after forming flexible inner bag 24, adhesive stripes 32 are bonded to the exterior surface of flat film 26 so that stripes 32 preferably extend from the middle upward toward top end 28 of flexible inner bag 24. There are many alternative configurations available for adhesive stripes 32. Stripes 32 could be spots, arcs, or lines at different angles. However, since stripes 32 generally add stiffness to the portions of flat film 26 to which they are bonded, and since flexible inner bag 24 is usually folded along lines parallel to the vertical axis of the bag for bag insertion purposes, the preferred orientation of adhesive stripes 32 is also parallel to the vertical axis of the bag to facilitate bag folding.

Figure 3A:
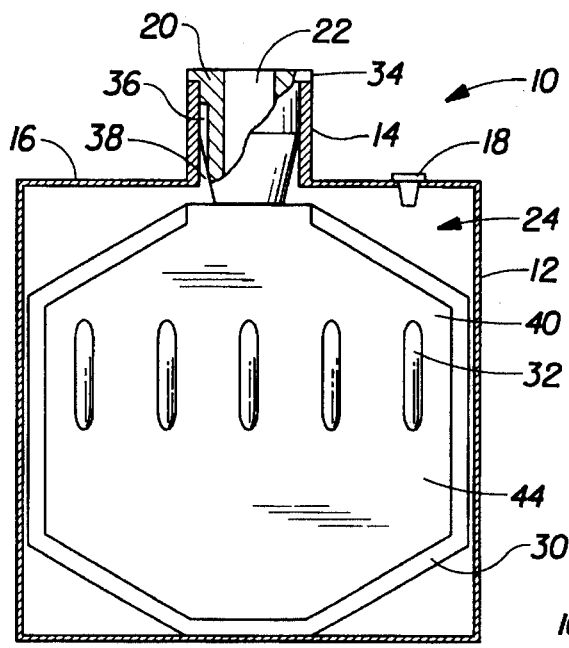
FIG. 3a is a partially sectioned front elevation view of the squeezebottle dispenser of FIG. 1, taken along section line 3—3 of FIG. 1, showing the flexible inner bag of FIG. 2 expanded within the squeezebottle.

FIG. 3a shows additional features of squeezebottle 10. Rigid fitment 20 has a flange 34 and an air vent slot 36 spaced away from flange 34. Rigid fitment 20 fits tightly into finish 14 of squeezebottle 10, plugging a discharge opening 38. Slot 36 allows air to vent from squeezebottle 10 when rigid fitment 20 is partially inserted into finish 14, while flexible inner bag 24 is expanded inside squeezebottle 10. After bag expansion, rigid fitment 20 is driven fully into finish 14 until stopped by flange 34. Discharge opening 38 is thereby closed in a substantially air-tight manner.

The preferred process for installing flexible inner bag 24 is in accordance with the teachings of commonly assigned U.S. Pat. No. 5,227,015, issued to Brown et al. on Jan. 11,1994, which is hereby incorporated herein by reference in its entirety. Brown et al. uses a converging funnel with angled plows to gather and fold a flexible inner bag as it is pushed through a funnel by a spring-loaded plunger. The plunger extends through a central passage of a rigid fitment to the bottom of the bag. Brown et al. uses compressed air to expand the flexible inner bag inside a container.

In the present invention flexible inner bag 24 must be fully expanded inside squeezebottle 24 before adhesive stripes 32 may be activated to affix bag 24 to an inner side wall of body 12 of squeezebottle 10. After insertion of flexible inner bag 24 in the present invention, air or steam is injected into bag 24 to force the bag to expand inside squeezebottle 10.

Figure 3B:
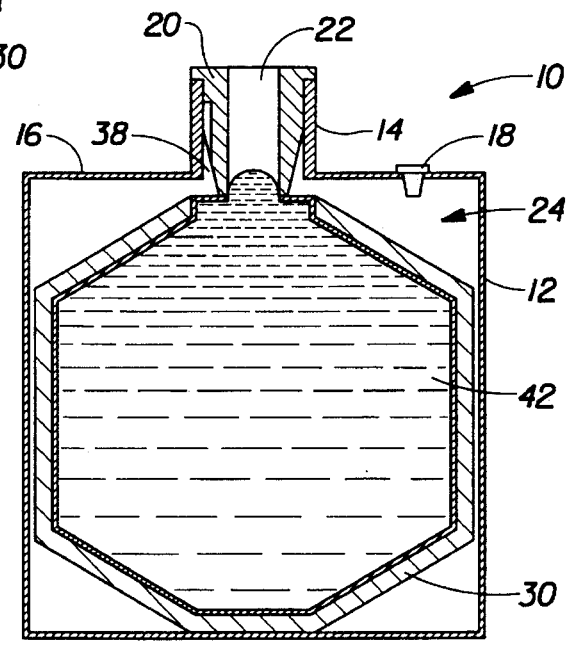
FIG. 3b is a sectioned front elevation view thereof, taken along section line 3—3 of FIG. 1, showing the flexible inner bag filled with fluid.
Figure 3C:
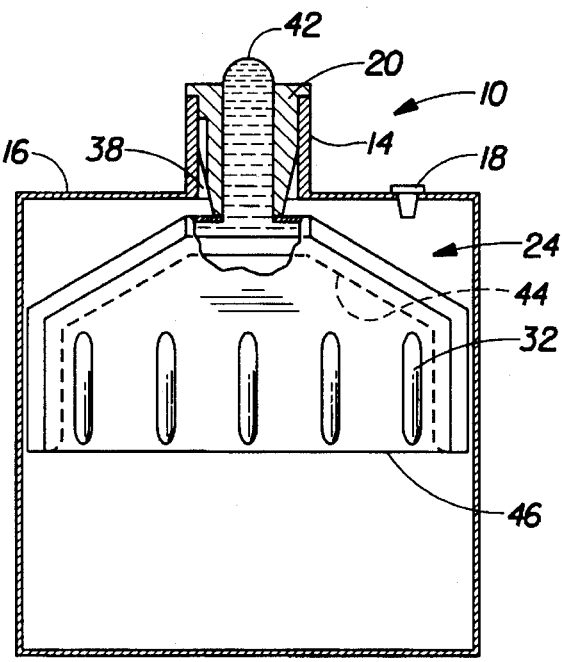
FIG. 3c is a partially sectioned front elevational view thereof, taken along section line 3—3 of FIG. 1, disclosing the bottom half of the flexible inner bag inverted inside the upper half, with the only fluid remaining being that in the passage of the rigid fitment of the flexible inner bag.

Flexible inner bag 24 has an upper half 40, a bottom half 44, and a midline 46. Midline 46 is defined by the lowermost edges of adhesive stripes 32. FIGS. 3a, 3b, and 3c show the sequence of events after flexible inner bag 24 is expanded inside squeezebottle 10. First, as shown in FIG. 3a, upper half 40 of flexible inner bag 24 is affixed to squeezebottle 10 at adhesive stripes 32. Then, as shown in FIG. 3b, flexible inner bag 24 is filled with a fluid 42 through passage 22 of rigid fitment 20. Finally, as shown in FIG. 3c, repeated squeezing of squeezebottle dispenser 10 causes flexible inner bag 24 to empty and invert. That is, bottom half 44 of flexible inner bag 24 rises as fluid 42 is dispensed. Bag 24 turns inside out about midline 46. Bottom half 44 rises inside upper half 40.

Air is vented into the squeezebottle by vent valve 18 as the bag inverts. If vent valve 18 is located in shoulder 16 of squeezebottle 10, adhesive stripes 32 must be intermittently spaced so that air may pass between them to below midline 46. If vent valve 18 is located at the bottom of squeezebottle 10, there would be no such requirement for intermittent spacing.

One alternative for affixing the upper half of flexible inner bag 24 to the inner side wall of body 12 of squeezebottle 10 is hot air and/or steam circulated to conduct heat to the inside of the bag or to the outside of the bottle in order to activate a heat-activated adhesive. Heat is conducted through either tile bag or the squeezebottle to the adhesive.

Another alternative is radiation heat from a probe placed inside the bag or from a source placed outside the bottle in order to activate a heat-activated adhesive. Typically infrared radiation is preferred. Heat radiates to the bag or to the bottle and is then conducted therethrough to the adhesive.

Still another alternative is magnetic induction heating of a heat-activated adhesive which has had metal particles added to it. An induction field may be created inside of the bag or outside of tile squeezebottle, depending on size limitations for the magnetic induction coil. The magnetic field heats the metal particles and they conduct heat to the adhesive. In this alternative heat doesn't have to be conducted through the bag or the bottle.

In each these alternatives, the adhesive is activated at a lower temperature than the melting temperature of flexible inner bag 24 and squeezebottle 10. Activation occurs when the adhesive either melts or becomes tacky enough to wet the surface of the inner side wall of the squeezebottle and adhere to it. A lasting bond occurs between the bag and the inner wall of the squeezebottle in the presence of pressure forcing them together.

In a particularly preferred embodiment of the present invention, steam at about 250° F. is blown into bag 24 and allowed to escape so that less than 5 psig pressure is built up inside the bag. Heating occurs for less than 30 seconds in order to activate adhesive stripes 32 to bond bag 24 to inner side wall of squeezebottle body 12.

Bag 24 is preferably made from low density polyethylene film. Squeezebottle 10 is preferably made of high density polyethylene by an injection blow molding process. It is shaped similar to a 6 oz. Oil of Olay Beauty Fluid® bottle, a Trademark of The Procter & Gamble Company of Cincinnati, Ohio. Body 12 has an oval cross-section with a major axis of 71 mm, a minor axis of 35.6 mm, and a height of approximately 107.7 mm. Squeezebottle 10 has a standard 24 mm finish 14, which has a discharge opening 38 having a diameter of 18.8 mm. Bag 24 has an injection molded rigid fitment 20 made of low density polyethylene. The fin-sealed edges 30 have a width of approximately 1.6 mm. The flat width of bag 24 is 92 mm and the height of the flexible inner bag is 118 mm. The bag dimensions are slightly larger than the inner dimensions of the bottle in order to fill the bottle when expanded.

Adhesive stripes 32 are preferably made of 3M Jet-melt #3748-TC hot melt adhesive, made by 3M Corp., of St. Paul, Minn. The softening point of the adhesive is well below that of the bag and bottle materials in order that the adhesive become tacky at the interface between bag and bottle, but that the bag and bottle surfaces experience minimal softening. Adhesive stripes 32 are spaced about 19 mm apart, are about 3 mm wide, and are about 19 mm long. They are applied to flat film 26 by a hand held 3M Polygun TC hot melt applicator, made by 3M Corp., of St. Paul, Minn.

Alternatively, for magnetic induction field heat activation, adhesive stripes 32 are made of the same adhesive, but with ferrous oxide particles mixed in. The percent by weight of particles in the adhesive, and the intensity of the induction field, determine the time of heating required to melt the adhesive. An induction field can be produced by a circular copper coil, commonly known in the art, into which squeezebottle 10 is centered without touching the coil. The coil may be cooled by circulating water and powered by an RF generator, such as model no. T53-KC-SW, made by the Lepel Co. of New York, N.Y.

When the adhesive heat-activating source is external to the squeezebottle, pressurizing the inside the bag for sealing the bag to the inner side wall of the squeezebottle can be accomplished by first exposing squeezebottle 10 to a higher than atmospheric pressure environment, such as in a pressure chamber, not shown. This step is followed by plugging passage 22 in rigid fitment 20 to maintain the higher than atmospheric pressure in bag 24, and then by removing squeezebottle 10 from the higher than atmospheric pressure environment before heat activating the adhesive. After heat-activation, the plug, such as an ordinary rubber stopper, may be removed from passage 22 to release the pressure from bag 24.

The key is to generate a higher pressure inside the bag than exists outside the bag so that the bag presses the adhesive against the inner side wall of the squeezebottle during heat-activation of the adhesive. This condition may also be accomplished by evacuating the space between the bag and the squeezebottle before pressing the bag fitment fully into the bottle finish. For example, squeezebottle 10 is first placed in a vacuum chamber, not shown. Slot 36 in rigid fitment 20 permits evacuation of air from between bag 24 and the squeezebottle. Then rigid fitment 20 is pressed into finish 14 to seal squeezebottle 10 in a substantially air-tight manner. When squeezebottle 10 is removed from the vacuum chamber, the vacuum remains between bag 24 and the inner side wall of squeezebottle 10. Atmospheric pressure inside bag 24 presses bag 24 against the inner side wall. Adhesive heat activation may then proceed from either inside bag 24 or outside squeezebottle 10.

Another alternative includes providing adhesive stripes parallel to the axis of the container along the full length of bag 24. In this situation, the fluid-filled bag cannot invert when the squeezebottle is squeezed. However, if the adhesive stripes are sufficiently spaced apart, the bag may collapse radially, generating axial folds. Because adhesive holds the bag to the side wall of the outer container along the full length of the bag, bag collapse may not require a diptube to prevent premature collapse near the discharge opening.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for attaching a flexible inner bag to an inner side wall of a single-piece squeezebottle having a body and a discharge opening, said body having an inner side wall and a cross-sectional dimension, said discharge opening having a dimension substantially smaller than said cross-sectional dimension of said body, said method comprising the steps of:
    a) constructing a flexible inner bag having an interior and an exterior surface, said exterior surface having heat-activated adhesive stripes thereon;
    b) inserting said flexible inner bag through said discharge opening and into said body of said single-piece squeezebottle;
    c) expanding said flexible inner bag inside said body of said single-piece squeezebottle prior to activating said heat-activated adhesive;
    d) closing said single-piece squeezebottle in a substantially air-tight manner; and
    e) activating said heat-activated adhesive on said exterior surface of said flexible inner bag, after said flexible inner bag has been expanded, while pressurizing said flexible inner bag to press said heat-activated adhesive against said inner side wall.

2. The method of claim 1 wherein said activating step includes circulating a compressed, heated gas into said interior of said flexible inner bag to conduct heat through said flexible inner bag to activate said heat-activated adhesive.

3. The method of claim 2 wherein said compressed, heated gas comprises steam.

4. The method of claim 1 wherein said activating step includes radiating heat into said interior of said flexible inner bag to conduct heat through said flexible inner bag to activate said heat-activated adhesive.

5. The method of claim 1 wherein said heat-activated adhesive has metal particles therein and said activating step includes induction heating said metal particles to conduct heat to activate said heat-activated adhesive.

6. A method for attaching a flexible inner bag to an inner side wall of a single-piece squeezebottle having a body and a discharge opening, said body having a cross-sectional dimension, said discharge opening having a dimension substantially smaller than said cross-sectional dimension of said body, said method comprising the steps of:
    a) constructing a flexible inner bag, said flexible inner bag having an exterior surface, an interior, a top end, an upper half, and a bottom half, said top end of said flexible inner bag having a rigid fitment attached thereto, said rigid fitment having a passage therethrough providing fluid communication with said interior of said flexible inner bag, said exterior surface of said flexible inner bag having heat-activated adhesive stripes bonded to said upper half of said flexible inner bag, said heat activated adhesive stripes having metal particles therein;
    b) inserting said flexible inner bag through said discharge opening and into said body of said single-piece squeezebottle;
    c) expanding said flexible inner bag inside said body of said single-piece squeezebottle prior to activating said heat-activated adhesive;
    d) closing said single-piece squeezebottle in a substantially air-fight manner; and
    e) induction heating said metal particles in said adhesive stripes to conduct heat to activate said heat-activated adhesive on said exterior surface at said upper half of said flexible inner bag, after said flexible inner bag has been expanded, while pressurizing said flexible inner bag to press said heat-activated adhesive against said inner side wall.

7. The method of claim 6 wherein said pressurizing step comprises the steps of:
    a) exposing said squeezebottle with said flexible inner bag expanded therein to a higher than atmospheric pressure environment;
    b) plugging said passage in said rigid fitment to maintain said higher than atmospheric pressure in said flexible inner bag;
    c) removing said squeezebottle from said higher than atmospheric pressure environment before activating said heat-activated adhesive; and
    d) unplugging said passage in said rigid fitment after affixing said flexible inner bag to said inner side wall of said squeezebottle.

8. The method of claim 6 wherein said pressurizing step comprises the steps of: a) exposing said squeezebottle with said flexible inner bag expanded therein to a vacuum prior to closing said squeezebottle in a substantially air-tight manner; b) closing said squeezebottle in a substantially air-tight manner while in said vacuum; and c) removing said squeezebottle from said vacuum before activating said heat-activated adhesive.

* * * * *